United States Patent [19]
Edelhoff et al.

[11] Patent Number: 4,728,241
[45] Date of Patent: Mar. 1, 1988

[54] APPARATUS FOR LIFTING AND REMOVING GARBAGE CONTAINERS FROM GARBAGE TRUCKS

[75] Inventors: Gustav D. Edelhoff, Iserlohn, Fed. Rep. of Germany; Fred T. Smith, Palos Verdes Pen, Calif.

[73] Assignee: Edelhoff Polytechnik GmbH & Co., Iserlohn, Fed. Rep. of Germany

[21] Appl. No.: 733,864

[22] Filed: May 14, 1985

[30] Foreign Application Priority Data

May 29, 1984 [DE] Fed. Rep. of Germany ....... 3420059

[51] Int. Cl.⁴ .................................................. B65F 1/00
[52] U.S. Cl. ..................................... 414/392; 414/344; 414/395
[58] Field of Search .............. 414/373, 395, 389–392, 414/398–400, 344, 564, 396; 193/35 A, 40, 35 SS, 35 TE; 198/614, 746

[56] References Cited

U.S. PATENT DOCUMENTS

| Re. 31,060 | 10/1982 | Lutz | 414/400 X |
|---|---|---|---|
| 561,631 | 6/1896 | Wadley | 414/391 X |
| 2,107,569 | 2/1938 | Hamlin | 414/344 X |
| 2,627,960 | 2/1953 | Eberle | 193/35 TE |
| 3,017,157 | 1/1962 | Parsons et al. | 251/66 |
| 3,374,878 | 3/1968 | Kornylak | 193/35 TE X |
| 3,640,410 | 2/1972 | Pioch | 414/344 X |
| 3,721,354 | 3/1973 | Raynes et al. | 414/396 |
| 3,826,347 | 7/1974 | Kornylak | 198/614 |
| 3,853,230 | 12/1974 | Schultz | 414/392 X |
| 3,896,944 | 7/1975 | Idoffsson | 414/344 |
| 3,913,758 | 10/1975 | Faircloth et al. | 414/373 |
| 4,010,843 | 3/1977 | Lucas | 198/614 X |
| 4,051,959 | 10/1977 | Staff et al. | 414/399 X |
| 4,136,763 | 1/1979 | Pryor et al. | 193/35 A |
| 4,277,217 | 7/1981 | Miller et al. | 198/746 X |
| 4,383,598 | 5/1983 | Newman | 193/35 A |
| 4,459,732 | 7/1984 | Driggers | 193/35 TE X |

FOREIGN PATENT DOCUMENTS

| 1755118 | 12/1971 | Fed. Rep. of Germany ...... 414/373 |
| 1332474 | 6/1963 | France ............................... 193/35 A |

Primary Examiner—Joseph E. Valenza
Assistant Examiner—David A. Bucci
Attorney, Agent, or Firm—Morgan & Finnegan

[57] ABSTRACT

Garbage can be collected and fowarded in an economical manner by garbage trucks on which containers are detachably mounted. The containers can be lifted and removed from the garbage trucks and transferred to forwarding trucks in a simple operation. This is accomplished by the provision of a conveyor for transversely conveying the containers the conveyor having a receiving end which is dispsoed approximately on the level of the load platforms of the garbage trucks and which is provided at that end with tine-like arms, which are adapted to be moved under the containers when they have been unlocked. The arms are adapted to be lifted and lowered and to be extended from and to be retracted into the receiving end of the conveyor.

5 Claims, 12 Drawing Figures

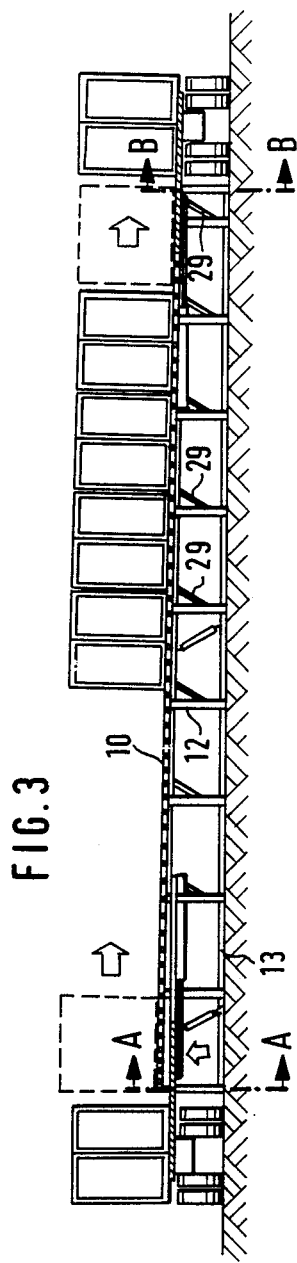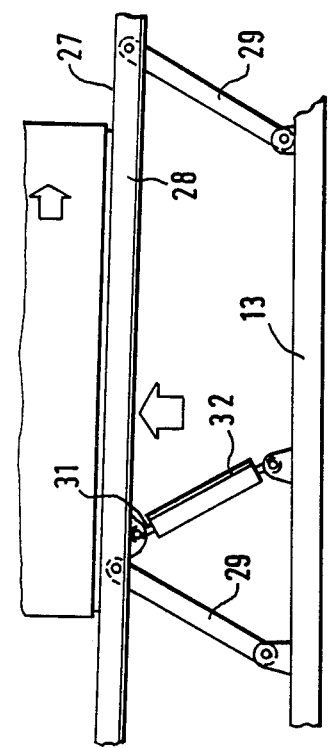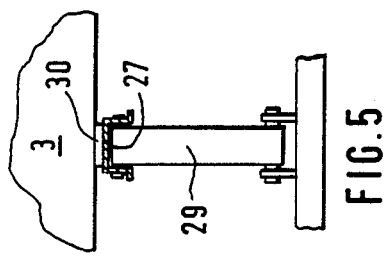

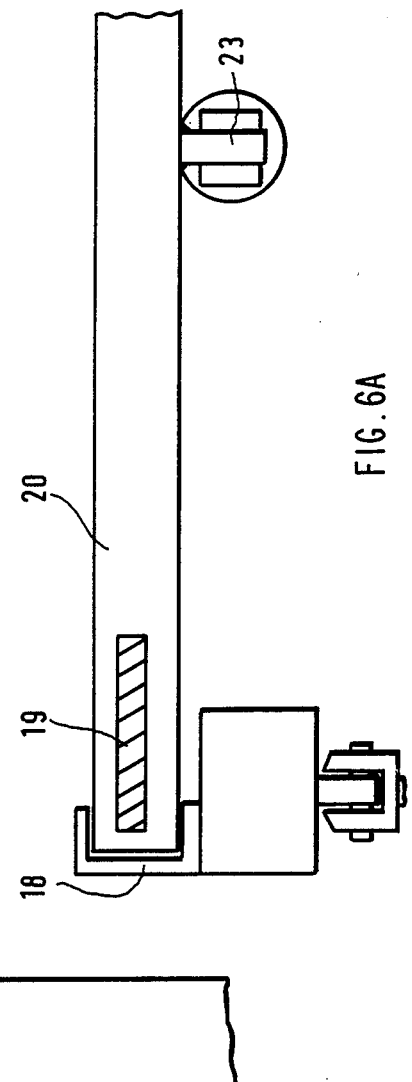

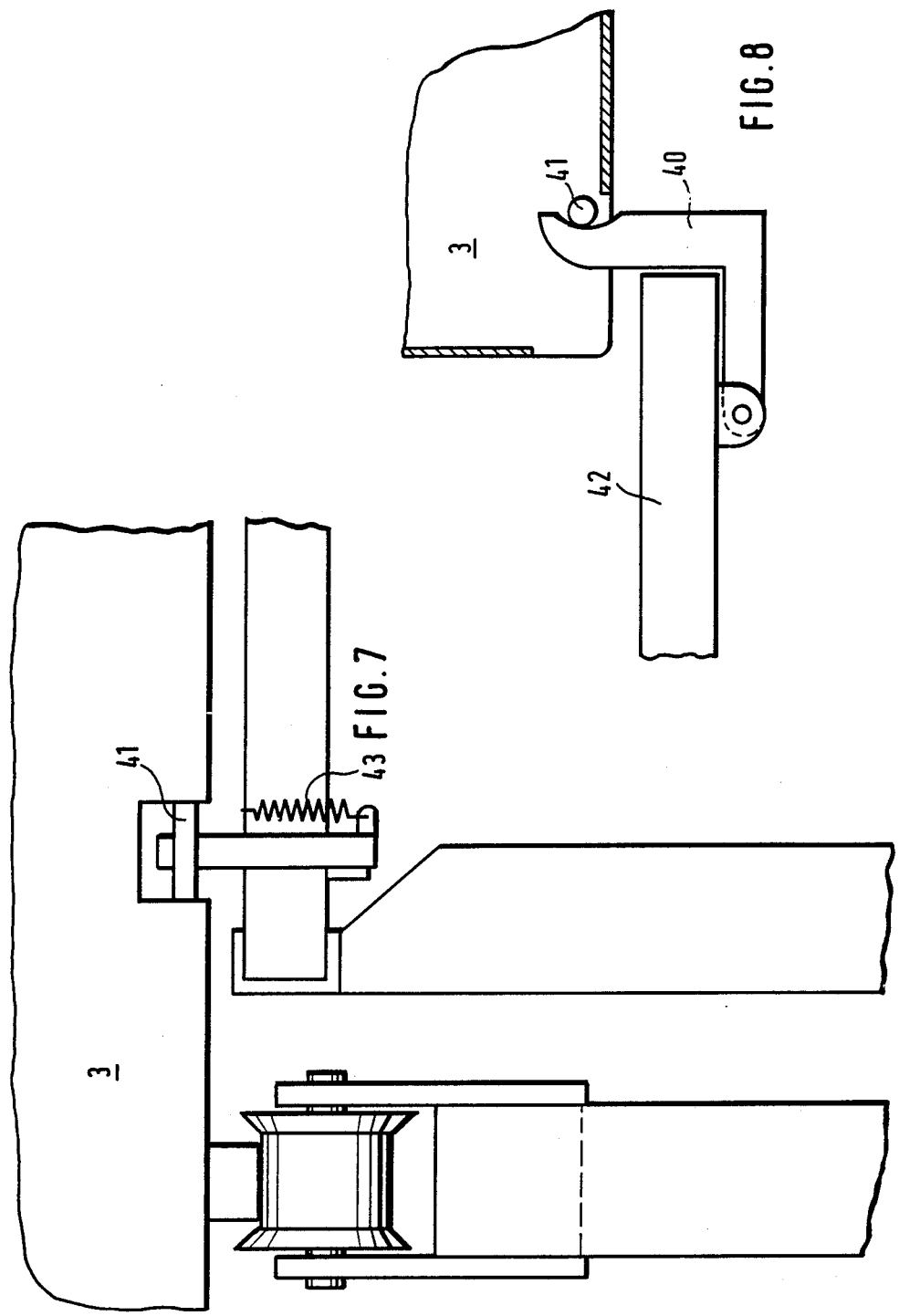

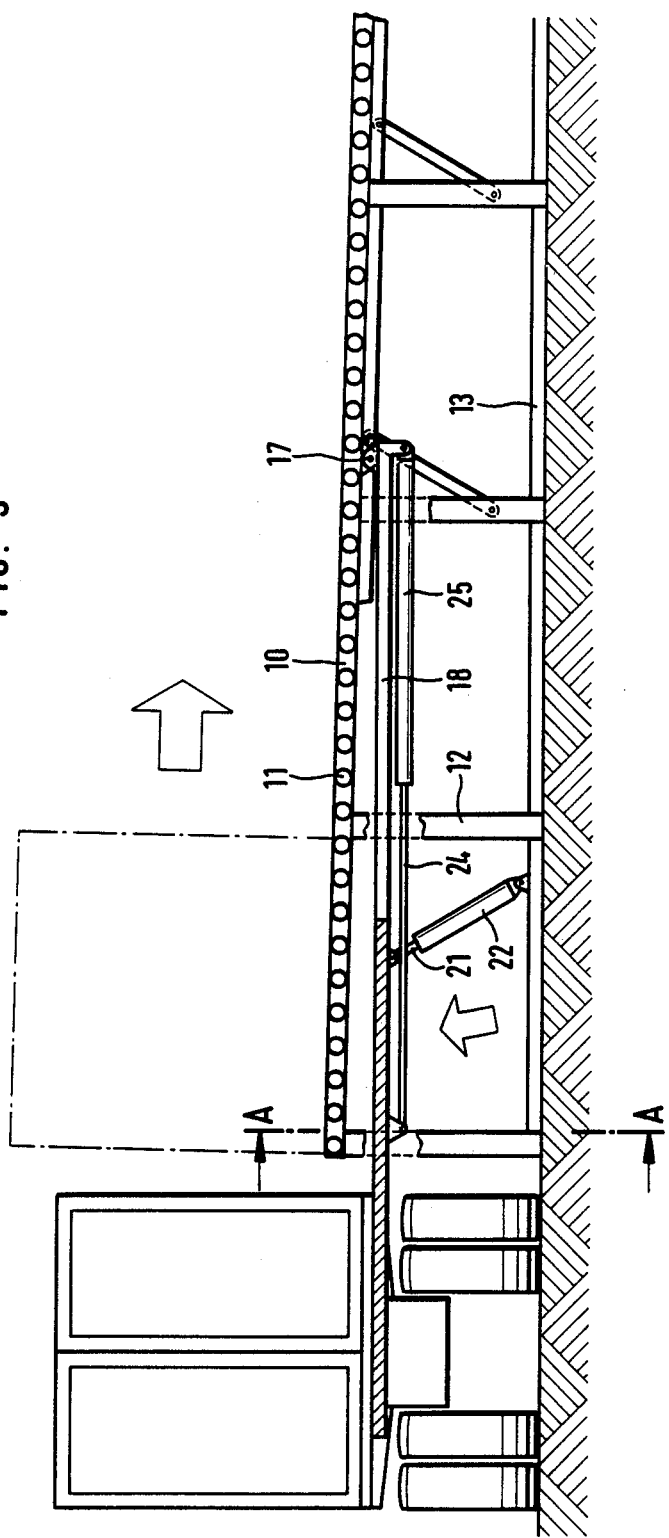

APPARATUS FOR LIFTING AND REMOVING GARBAGE CONTAINERS FROM GARBAGE TRUCKS

BACKGROUND OF THE INVENTION

1. Field of the Invention

This invention relates to apparatus for lifting and removing detachably mounted containers from garbage trucks.

2. Description of the Prior Art

German Patent Specification No. 24 58 903 and German Patent Application No. P 34 20 058.4 filed May 29, 1984 disclose a "Motor-operated Garbage Truck Comprising Detachable Containers". Such garbage trucks are used to collect garbage in containers and to carry the containers filled with garbage to a central container transfer station, where the filled containers are replaced by empty ones and from which the filled containers are forwarded by special forwarding trucks to dumps. The collection of garbage in such containers detachably mounted on trucks will ensure an economical disposal of garbage because the garbage trucks specially designed for the collection of garbage can be used only for the collection of garbage and travel only over relatively short distances to the central container transfer station and special forwarding trucks adapted to carry a plurality of containers each can be used to forward the containers to remote dumps.

In the operation of the garbage trucks disclosed in German Patent Specification No. 24 58 903 the containers are lifted from the chassis of the garbage trucks by means of struts, which are provided at the corners of the container, and which can be extended in a downward direction from the bottom of the container; or the containers are provided with different lifting and supporting means for that purpose, so that they can be transferred to the forwarding truck when that truck is backed up under the raised container and the container is subsequently lowered onto the forwarding truck, and then locked in position on the latter.

The capacity and economy of a given system for collecting garbage by means of detachably mounted containers highly depends on the time required to replace the containers and to forward them to the dumps.

SUMMARY OF THE INVENTION

It is an object of the invention to provide an apparatus of the kind described first hereinbefore which can be conveniently operated and can be automated to a high degree by which the containers can be lifted and removed from the garbage trucks and can be forwarded or moved to a position from which they can be forwarded.

The object is accomplished in accordance with the invention by the provision of a conveyor for transversely conveying the containers the conveyor having a receiving end which is disposed approximately on the level of the load platform of the garbage truck and which is provided at that end with tine-like arms which are adapted to be moved under the containers when they have been unlocked, the arms being adapted to be lifted and lowered and to be extended from and to be retracted into the receiving end of the conveyor. In the apparatus in accordance with the invention said tine-like arms, which are similar to the prongs of a forklift truck, are first extended to a position under the unlocked container and are then actuated to perform lifting, retracting and lowering movements in succession so that the container will be lifted from the garbage truck and deposited on the conveyor. When it is desired to remove a container from a garbage truck, it is sufficient to back up the latter to a suitable position in front of the receiving end of the conveyor so that the container which has been unlocked, preferably by an automatic operation, can be lifted by the tine-like arms and can be deposited by them onto the conveyor. As a result, the container is removed from the garbage truck in very short time so that the garbage truck can subsequently receive an empty container and is then ready for continued operation. The containers which have been removed from the garbage trucks are conveyed in a transverse orientation on the conveyor and are thus removed from the receiving station so that the container of another garbage truck can then be lifted, deposited on the conveyor and removed from the receiving station.

The conveyor suitably consists of a roller conveyor which is downwardly inclined from its receiving end and is provided with means for braking the containers deposited on the conveyor. The containers are conveyed on the inclined roller conveyor by gravity and each container will advance until it is braked to a stop or impinges on a preceding container. As a result, the containers to be forwarded can be closely spaced in a row.

The braking means suitably consist of laterally disposed brake beams, which are provided with brake linings and are adapted to be raised above and lowered below the plane of conveyance of the conveyor. The brake beams may be connected by parallel links to the base frame of the roller conveyor and may be adapted to be lifted and lowered by a fluid-operated piston-cylinder unit, which is pivoted at its ends to the base frame and to the brake beams or to the parallel links. The lifting and lowering of the brake beams may be automatically controlled in such a manner that the containers received by the conveyor in the receiving station slide down slowly on the roller conveyor so that strong impacts will be avoided.

At the delivery end of the conveyor, the containers are transferred to forwarding trucks for forwarding to dumps. For that purpose the conveyor is suitably provided also at its delivery end with tine-like arms, which are adapted to be lifted and lowered and to be extended and retracted and can be used to lift each container from the delivery end of the conveyor to a forwarding truck or the like. The conveyor may be provided at its delivery end with a pusher for pushing the containers onto the forwarding trucks.

A similar conveyor is provided for lifting empty containers from the forwarding trucks and for conveying and transferring the empty conveyors to the garbage trucks. Two parallel transporting, lifting and transferring conveyors are preferably installed in the central container transfer station so that each garbage truck can deliver its container to the receiving station of the first conveyor and can then move a few meters ahead to the delivery end of the second conveyor where the garbage truck can receive an empty container, which may be pushed onto the garbage truck by a pusher from the delivery end of the second conveyor. At the opposite ends of the conveyors, the delivery of filled containers and the receipt of empty containers are similarly performed.

Similar conveyors may be provided near the dumps and may serve to unload and load the forwarding trucks. Such conveyors convey the containers to means for tipping the containers, and receive the empty containers and deliver them for their return transportation.

BRIEF DESCRIPTION OF THE DRAWING

FIG. 3 is a side elevation showing a conveyor for removing filled containers from garbage trucks and for delivering the containers to forwarding trucks.

FIG. 4 is a side elevation showing on a larger scale the means for braking containers, which are conveyed in a transverse orientation.

FIG. 5 is a front elevation showing the braking means of FIG. 4.

FIG. 6 is a sectional view taken on line A—A in FIG. 3 and showing the conveyor.

FIG. 6A is a partial, lateral, sectional view of the conveyor shown in FIG. 6 illustration in detail the arrangement of the tine-like arm which is adapted to move under the containers at the receiving end of the conveyor.

FIG. 7 is a sectional view taken on line B—B in FIG. 3 and showing the conveyor.

FIG. 8 is a partial, lateral, sectional view of the conveyor shown in FIG. 7 illustrating in detail the arrangement of the pusher for pushing a container from the conveyor.

FIG. 9 is a side elevation showing on a larger scale the receiving end of the conveyor of FIG. 3.

DETAILED DESCRIPTION OF THE PREFERRED EMBODIMENT

Figure 1:
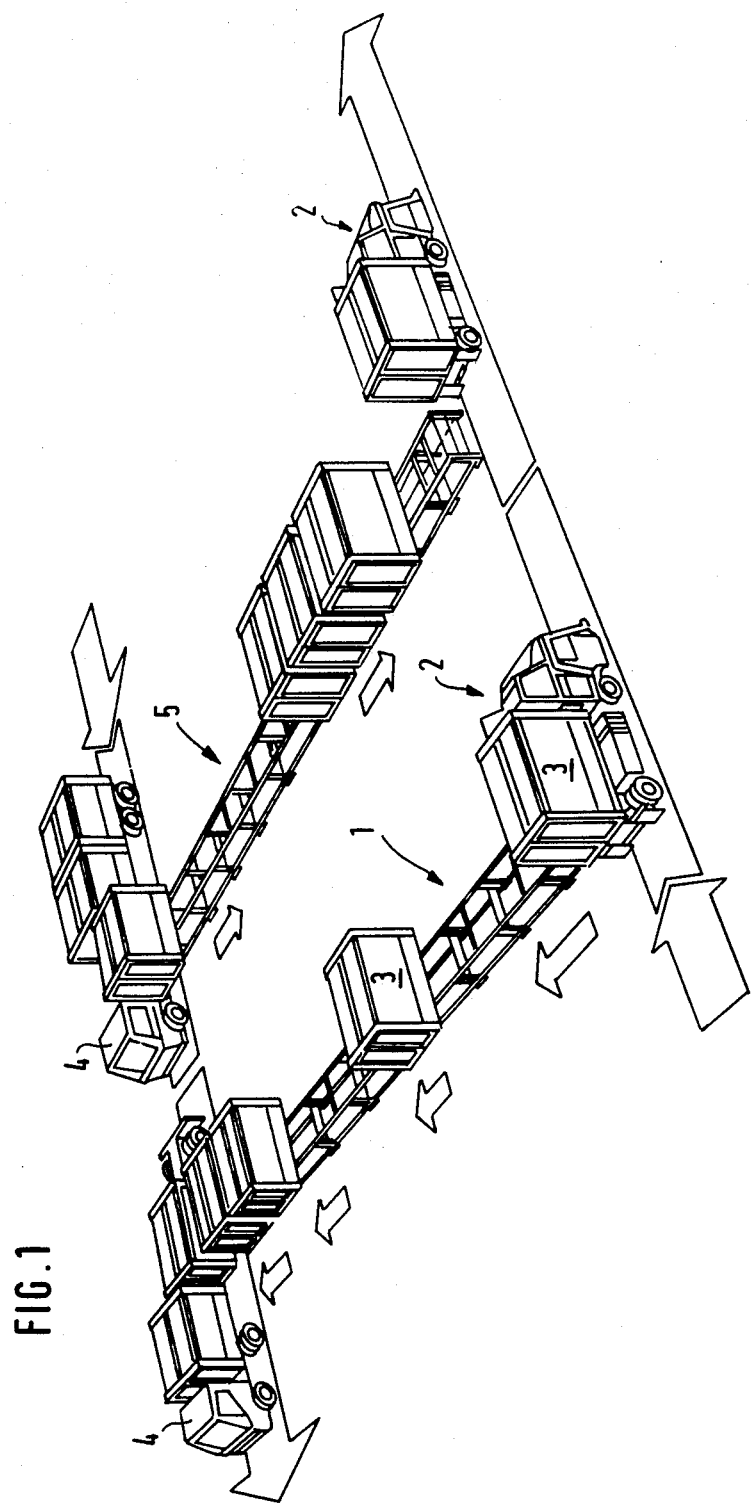
FIG. 1 is a perspective view showing two parallel conveyors, one of which serves to unload filled containers from garbage trucks and to deliver said containers to forwarding trucks, and the other of which serves to remove empty containers from forwarding trucks and to deliver the empty containers to garbage trucks.

The central container transfer station shown in FIG. 1 comprises a conveyor 1, by which filled containers 3 are received from garbage trucks 2 and conveyed to a delivery end, where the containers are delivered to forwarding trucks 4, which can carry three containers each.

A conveyor 5 which is similar to the conveyor 1 extends parallel to the latter but serves to convey in the opposite direction. As is shown, the conveyor 5 receives empty containers from forwarding trucks 4 and deposits the empty containers onto the garbage trucks 2.

Figure 2:
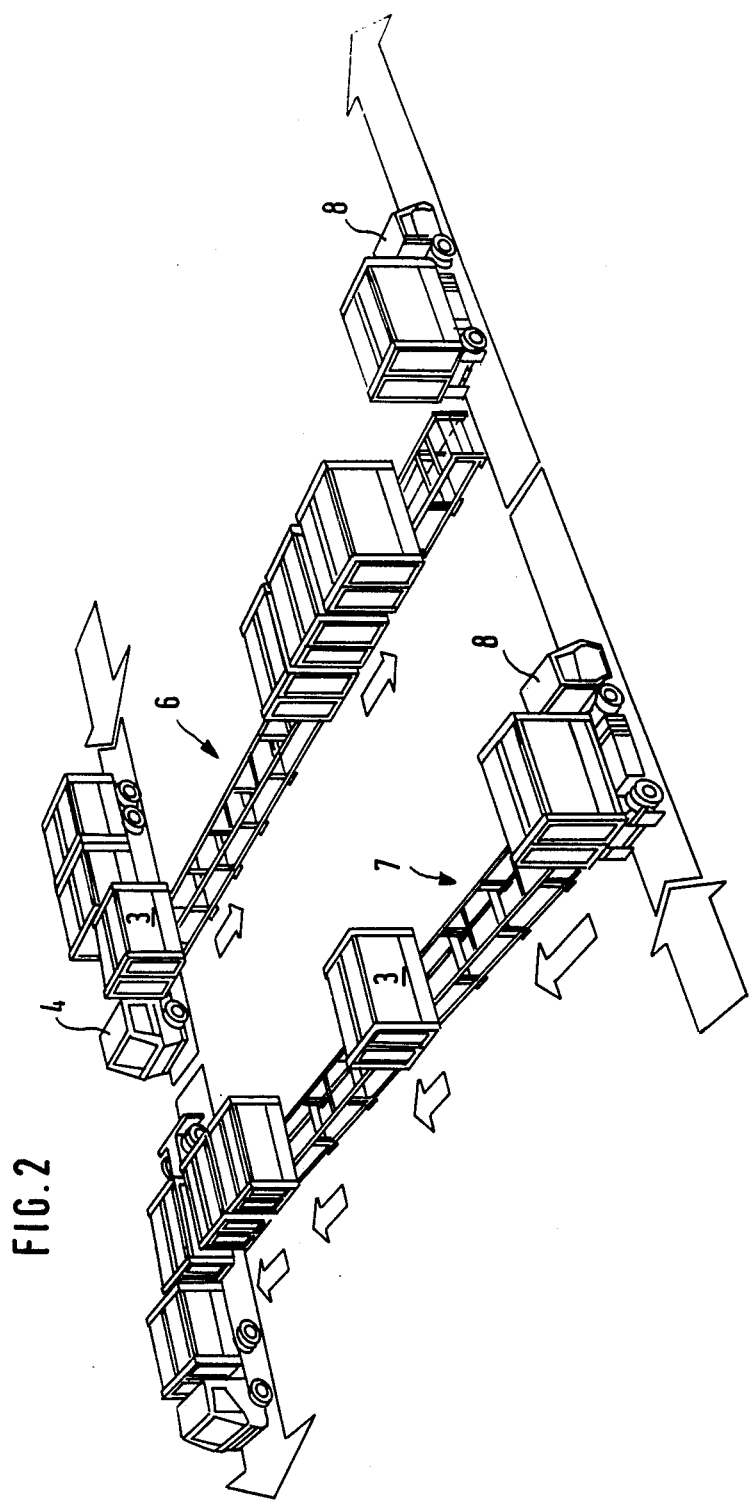
FIG. 2 shows two conveyors which are similar to those of FIG. 1 and one of which serves to remove filled containers from forwarding trucks and to deliver the filled containers to means for tipping the containers, the other conveyor serving to receive empty containers and to deliver them to forwarding trucks.

FIG. 2 shows a container transfer station provided near a dump. The containers 3 delivered by forwarding trucks 4 are received by the conveyor 6 at its receiving end and are held at its delivery end in such a manner that the containers can be taken over by the tipping trucks 8, which serve only to carry the containers directly to the dump and to tip the containers.

A conveyor 7 which is similar to the conveyor 6 is parallel to the latter and serves to convey in the opposite direction. The empty containers are delivered by the tipping trucks 8 to the receiving end of the conveyor 7 and are received by the latter. The empty containers 3 are conveyed in a transverse orientation on the conveyor 7 to its delivery end, where they are taken over by the forwarding trucks 4, which forward the empty containers to the central container transfer station shown in FIG. 1.

The filled containers 3 can be taken from the conveyor 6 and returned to the conveyor 7 by handling and tipping means differing from the tipping trucks 8.

The conveyor 1 will now be described more in detail with reference to FIGS. 3 to 10. The conveyor 1 comprises a frame 10, which carries rollers 11 and which is supported on a base frame 13 by means of posts 12. The rollers 11 are rotatably mounted on both sides of the frame 10 in lugs 13', 14, as shown in FIG. 6, which are welded to the frame 10. Each roller 11 is provided at opposite ends with frustoconical flanges 15. The containers 3 are provided on their undersides with parallel runners 16, with which the containers are supported on the rollers 11. The runners are guided between the flanges 15.

Referring now to FIGS. 9 and 6A, a guide frame 18 is pivoted to the frame 10 on the axis 17 between the rows of rollers 11 and comprises channel-shaped side rails, in which a carriage 20 is longitudinally slidable. The carriage 20 carries tines 19 as shown in FIG. 6A. The guide frame 18 is pivotally movable by means of a fluid-operable piston-cylinder unit having a piston rod 21, which is pivoted to the guide frame 18, and a cylinder 22, which is pivoted to the base frame 13. Another fluid-operable piston-cylinder unit comprises a piston rod 24, which is pivoted to the carriage 20 by a pivot 23 (FIG. 6A), and a cylinder 25, which is pivoted to the rear portion of the guide frame 18 at its center. The tines 19 can be extended, raised, retracted and lowered so that filled containers 3 can be lifted from the garbage truck 2 and deposited onto the receiving end of the conveyor 1 as shown in FIG. 1.

Figure 4A:
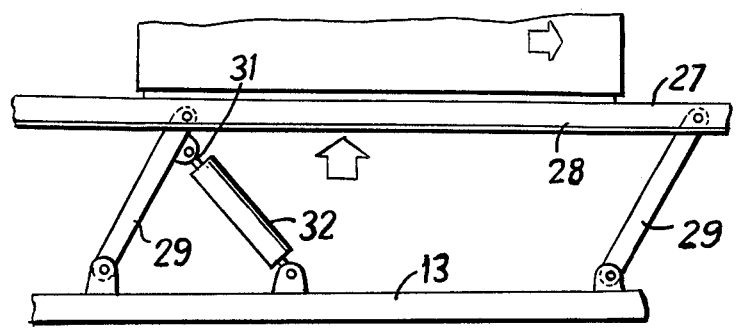
FIG. 4A is a side elevation view of a modification of the apparatus illustrated in FIG. 4 showing on a larger scale the means for braking containers, which are conveyed in a transverse orientation and in which a fluid-operated piston-cylinder unit is pivoted at its ends to the base frame and to a parallel link.

As shown in FIG. 4, a brake beam 28 provided with a brake lining 27 is provided between the rows of rollers 11 disposed on opposite sides of the conveyor and carried by the top frame 10. The brake beam is linked by parallel links 29 to the base frame 13 of the roller conveyor. Adjacent to the brake beam 28 each container 3 traveling on the roller conveyor is provided with a brake rail 30, as shown in FIG. 5. A fluid-operable piston cylinder unit comprises a piston rod 31, which is pivoted to the brake beam 28 or to parallel link 29, and a cylinder 32, which is pivoted to the base frame 13. The links 29 pivoted to the brake beam 28 are so inclined that the piston rod 31 can be extended to raise the brake beam 28 above the plane of the uppermost generatrices of the rollers 11 so that the brake lining 27 and the brake rail 30 cooperate to brake the containers 3 rolling on the inclined roller conveyor.

Figure 10:
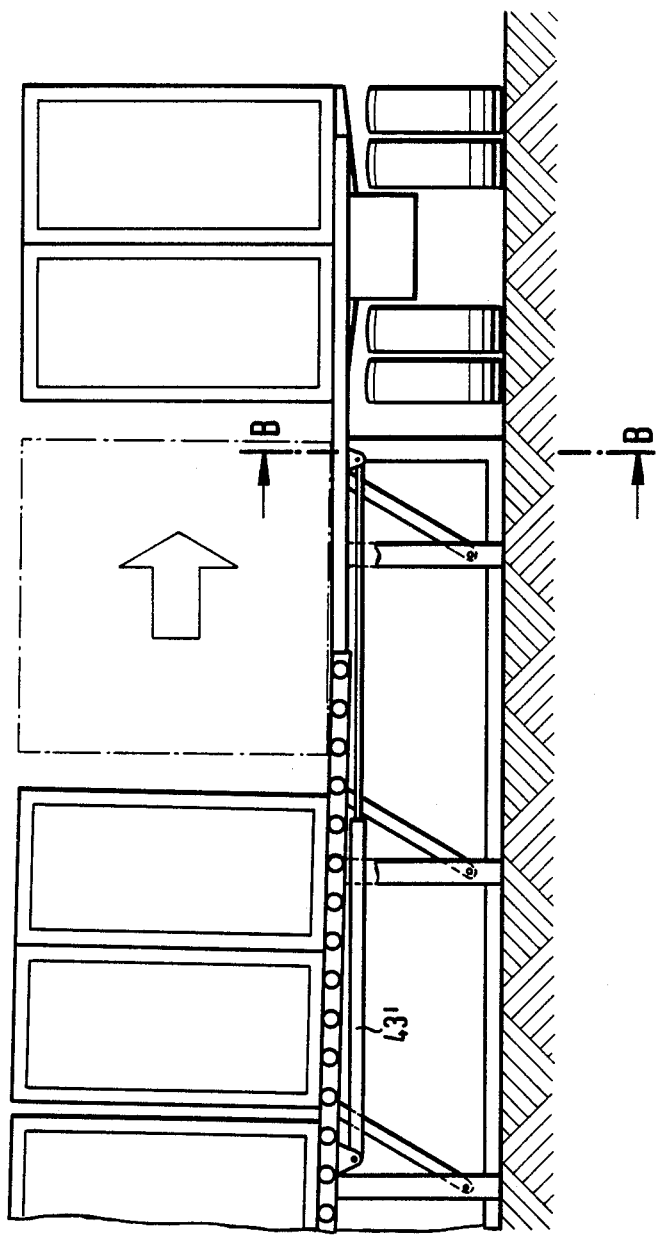
FIG. 10 is a side elevation showing on a larger scale the delivery end of the conveyor of FIG. 3.

Referring next to FIGS. 8 and 10, the delivery end of the conveyor 1 is shown on a larger scale in FIG. 10 and is provided with pushers 40 (FIG. 8) having angled end portions, which engage pins 41 of each container 3 from the rear and serve to push each container onto a forwarding truck. Each pusher 40 consists of a bell crank lever. The pushers 40 are pivoted to a carriage 42, which is reciprocable in tracks by a fluid-operable piston-cylinder unit 43', as shown in FIGS. 8 and 10. Tension springs 43 (FIG. 7) urge the pushers or bell crank levers in their pushing position against a stop carried by the carriage. When the carriage 42 has been retracted to disengage the pushers 40 from the pins 41, the pushers 40 can be pivotally moved in a clockwise sense in FIG. 8 against the force of the springs 43 and can then be moved under the container by the carriage 42.

Extensible tine-like arms which are suitably adapted to be raised and lowered may be provided also to permit the containers 3 to be pushed from the conveyor 1.

We claim:

1. Apparatus for lifting detachably mounted containers from garbage-collecting vehicles having load carrying platforms and for carrying said containers away from said vehicles, the containers being provided on their undersides with laterally disposed, longitudinally extending skids which are adapted to cooperate with brake rails disposed between said skids, said apparatus comprising an inclined roller conveyor for conveying said containers in a direction transverse to their longitudinal direction, the rollers of said conveyor being arranged in laterally disposed pairs and provided at their ends with flanges having radially and axially inwardly beveled inside surfaces and being axially spaced apart at their inner ends at least by a width equal to the width of a skid on a container, said skid on the container being supported by a roller between the flanges thereof, a receiving end of said roller conveyor having substantially the same elevation as the load-carrying platform of a garbage-collecting vehicle and being provided with arms having tines which are moved under a container when the container has been unlocked, and means to lift and lower the arms and to extend the arms beyond the receiving end of said conveyor and to retract the arms into or beyond said receiving end, and braking means located adjacent to a delivery end of said roller conveyor and which comprise a brake beam disposed in the middle portion of the width of said roller conveyor, or two brake beams disposed adjacent to the sides of said conveyor, said brake beam or said brake beams being provided with brake linings, and said brake beam or beams being adapted to be lifted above and to be lowered below the plane of conveyance by said rollers.

2. Apparatus according to claim 1 wherein the conveyor is downwardly inclined from its receiving end.

3. Apparatus according to claim 1 wherein the brake beam or brake beams are connected by parallel links to a base frame which carries a conveyor frame carrying the rollers of the roller conveyor, and the brake beam or beams are raised and lowered by a fluid-operable piston cylinder which is pivoted at one end to the base frame and at its opposite end to the brake beams or beams, or to a parallel link which is pivoted to the brake beam or beams.

4. Apparatus according to claim 1 wherein the coveyor is provided at its delivery end with a pusher for pushing each container from said conveyor.

5. Apparatus according to claim 1 wherein the roller conveyor comprises two rows of rollers disposed on opposite sides of said conveyor and each roller is provided at opposite ends with inwardly beveled flanges, which are space apart by a distance which exceeds the witdh of the skids provided on the underside of each container so that said rollers guide said skids between said flanges.

* * * * *